(12) United States Patent
Merkel

(10) Patent No.: US 6,576,579 B2
(45) Date of Patent: Jun. 10, 2003

(54) PHOSPHATE-BASED CERAMIC

(75) Inventor: Gregory A. Merkel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 09/969,562

(22) Filed: Oct. 1, 2001

(65) Prior Publication Data

US 2002/0061811 A1 May 23, 2002

Related U.S. Application Data

(60) Provisional application No. 60/237,622, filed on Oct. 3, 2000.

(51) Int. Cl.⁷ .......................... C04B 35/48; B01D 99/20
(52) U.S. Cl. ...................... 501/102; 501/104; 501/106; 55/523; 55/DIG. 30; 264/630
(58) Field of Search ................................ 501/102, 103, 501/104, 106; 55/523, DIG. 30; 264/630

(56) References Cited

U.S. PATENT DOCUMENTS 4,801,566 A   1/1989  Limaye et al. .............. 501/104
5,217,934 A   6/1993  Matsuhiro et al. ........... 501/106
5,488,018 A   1/1996  Limaye ...................... 501/104
6,413,895 B1 * 7/2002  Merkel ....................... 501/134
6,468,325 B1 * 10/2002 Cutler et al. .................. 55/523

OTHER PUBLICATIONS

Cutler et al, Pub. No. 2002/0132720, Refractory NZP–Type Structures and Method of Making and Using Same, Sep. 19, 2002.*

* cited by examiner

Primary Examiner—Karl Group
(74) Attorney, Agent, or Firm—Anca G. Gheorghiu

(57) ABSTRACT

A ceramic including a first phase having a general formula $R_{1+(x/2)}Zr_4P_{6-x}Si_xO_{24}$ where R is selected from the group consisting of Ba, Ca, and Sr and $0 \leq x \leq 2$, wherein the first phase has a volumetric heat capacity ($C_{p1}$), and at least 10 weight percent of a second phase having a volumetric heat capacity ($C_{p2}$), wherein $C_{p2} > C_{p1}$. The ceramic has a coefficient of thermal expansion from 22° to 1000° C. of $-15 \times 10^{-7}$/° C. to $+15 \times 10^{-7}$/° C., a permeability of at least $0.25 \times 10^{-12}$ m², a total porosity of at least 35% by volume, and a median pore diameter of at least 6 micrometers, and a volumetric heat capacity of the solid $C_{p(solid)}$ of at least 3.15 J/cm³ K.

65 Claims, 1 Drawing Sheet

PHOSPHATE-BASED CERAMIC

This application claims the benefit of U.S. Provisional Application No. 60/237,622, filed Oct. 3, 2000, entitled "Improved Phosphate Ceramic", by Gregory A. Merkel.

BACKGROUND OF THE INVENTION

The present invention relates to ceramic structures which include an NZP-type phosphate phase and a second phase of a substantially higher heat capacity per unit volume than the phosphate phase, the ceramic structures having a near zero thermal expansion over a temperature range from 22° to 1000° C., high permeability by virtue of high porosity and large median pore size, and good filtration efficiency, such that the structures are suitable for use as diesel particulate filters.

Recent interest has been directed towards the diesel engine due to its efficiency, durability and economical aspects. However, diesel emissions have come under attack both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

One of the biggest challenges in lowering diesel emissions is controlling the levels of diesel particulate material present in the diesel exhaust stream. In 1998 diesel particulates were declared a toxic air contaminant by the California Air Resources Board. Legislation has been passed that regulates the concentration and particle size of diesel particulate pollution originating from both mobile and stationary sources.

Diesel particulate material is mainly carbon soot. One way of removing the carbon soot from the diesel exhaust is through diesel traps. The most widely used diesel trap is the diesel particulate filter which filters the diesel exhaust by capturing the soot in or on the porous walls of the filter body. These filters known as "wall-flow" filters in which approximately half of the channels are plugged on the entrance face of the filter and the adjacent channels are plugged on the exit face of the filter, have been proven effective in trapping the carbonaceous particles present in the exhaust generated by diesel engines. Such filters typically have about 40–55% porosity and a median pore size of about 8 to 20 micrometers.

Once the carbon in the filter has accumulated to some level, the filter must be regenerated by burning the soot. Normally, the regeneration is accomplished under controlled conditions of engine management whereby a slow burn is initiated and lasts a number of minutes, during which the temperature in the filter rises from about 400–600° C. to a maximum of about 800–1000° C.

The highest temperatures during regeneration tend to occur near the exit end of the filter due to the cumulative effects of the wave of soot combustion that progresses from the entrance face to the exit face of the filter as the exhaust flow carries the combustion heat down the filter. Under certain unusual circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot (a reaction which is already highly exothermic) may produce temperature of up to 1300° C.–1500° C. or even higher.

In addition to capturing the carbon soot, the filter also traps "ash" particles, which consist of oxides such as those of calcium, zinc, magnesium, phosphorus, and sulfur, that are carried by the exhaust gas from burning of the engine lubricating oil, and oxides of metals such as iron and cerium that may be present as additives to the diesel fuel to aid in combustion of the soot. Additionally, oxide particles of iron, copper, and zinc may be present from wear of the engine components. These particles are not combustible and, therefore, are not removed during regeneration. However, if temperatures during uncontrolled regenerations are sufficiently high, the ash may eventually sinter to the filter or even react with the filter resulting in partial melting. Thus, filters must periodically be removed from the exhaust system and the ash must be flushed out of the filter, after which the filter is reinstalled.

During uncontrolled regenerations, the highest temperatures tend to occur near the exit face, where concentrations of oxide particles are greatest. These temperatures can result in extensive reaction between the oxide deposits and the ceramic filter. Depending upon the concentration and/or chemical composition of the oxide deposits, sufficiently high temperatures and long enough times at temperature can result in severe corrosion or even partial melting of the filter, producing "pinholes" through the walls of the filter. These pinholes subsequently lower the filtration efficiency of the filter by allowing soot to leak through the filter and exit the tailpipe. In sufficient number, the pinholes can result in a filter that is no longer in compliance with government environmental regulations. Alternatively, sintering and densification of the oxide deposits, or of the ceramic filter by reaction with the oxides, may result in reduced permeability and an unacceptable increase in back pressure of the filter against the engine.

Even if the temperatures are not sufficient to damage the filter, they may be high enough to cause partial sintering of the oxide particles to themselves or to the surface of the filter walls. Such sintered ash deposits may be difficult or impossible to remove from the filter during periodic maintenance, resulting again in an increase in back pressure and loss in soot loading capacity, the latter necessitating more frequent regenerations.

In the industry cordierite ($2MgO-2Al_2O_3-5SiO_2$) has been the cost-effective material of choice for diesel particulate filters for heavy duty vehicles due to its combination of excellent thermal shock resistance, filtration efficiency, and durability under most operating conditions. However, a significant problem associated with conventional cordierite diesel particulate filters is susceptibility to damage during the required filter regeneration cycling.

Pending application having Ser. No. 09/671,722, entitled "Refractory NZP-type Structures and Method of Making and Using Same" by Gregory A. Merkel, co-assigned to the present assignee, discloses NZP-type structures of the general composition having the general formula $R_xZ_4P_{6-y}Si_yO_{24}$, where $0 \leq x \leq 8$, $0 \leq y \leq 6$, R is Li, Na, K, Rb, Cs, Mg, Ca, Sr, Ba, Y, and/or lanthanides, and Z is Zr, Ti, Nb, Ta, Y, and/or lanthanides which possess near zero thermal expansion and melting points greater than 1700° C. and are especially useful as diesel particular filters. During laboratory bench tests, 2" diameter and 6" long filters of the compositions $Ba_{1.25}Zr_4P_{5.5}Si_{0.5}O_{24}$ and $Sr_{1.3}Zr_4P_{5.4}Si_{0.6}O_{24}$ have loaded with artificial carbon soot and have survived repeated simulated uncontrolled regenerations to 1600° C. However, larger-diameter filters (>5") when loaded with carbon soot and regenerated on engine dynamometers experienced failure. Examination of these filters after testing had shown that iron oxide containing particles (virtually absent from the laboratory tests using artificial soot), coupled with high temperatures, have resulted in the formation of holes extending all the way through the walls of the filter. The concentration of iron and the number of holes was greatest near the exit end of the inlet channels.

A need therefore exists for an NZP-type phosphate-based ceramic useful for diesel particulate filters absent the shortfalls described.

The present invention provides such a ceramic and a method of making and using it.

SUMMARY OF THE INVENTION

The instant invention is founded upon the discovery of a ceramic comprising a first phase having a general formula $R_{1+(x/2)}Zr_4P_{6-x}Si_xO_{24}$ where R is selected from the group consisting of Ba, Ca, and Sr and $0 \leq x \leq 2$, wherein the first phase has a volumetric heat capacity ($C_{p1}$), and at least 10 weight percent of a second phase having a volumetric heat capacity ($C_{p2}$), wherein $C_{p2} > C_{p1}$, wherein the ceramic has a coefficient of thermal expansion from 22° to 1000° C. of $-15 \times 10^{-7}$/° C. to $+15 \times 10^{-7}$/° C., a permeability of at least $0.25 \times 10^{-12}$ m$^2$, an total porosity of at least 35% by volume, and a median pore diameter of at least 6 micrometers, and a volumetric heat capacity of the solid, $C_{p(solid)}$ of at least 3.15 J/cm$^3$K, wherein the volumetric heat capacity of the solid is equal to the measured heat capacity, in units of J/g K, multiplied by the density of the solid portion of the ceramic in units of g/cm$^3$. The solid portion of the ceramic is exclusive of the porosity of the ceramic.

DETAILED DESCRIPTION OF THE INVENTION

Figure 1:
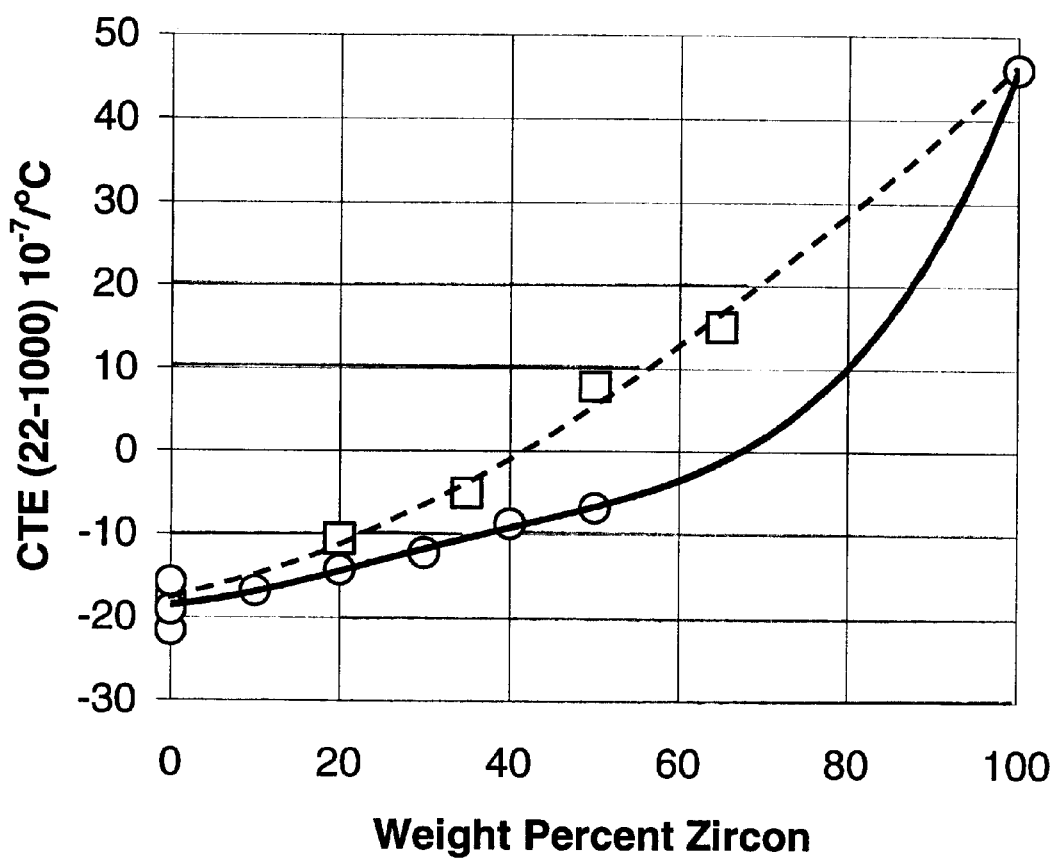
FIG. 1 presents the mean coefficient of thermal expansion from 22° to 1000° C. of cellular bodies prepared according to the present invention and comprising $CaZr_4P_6O_{24}$- zircon (circles) and $Sr_{1.5}Zr_4P_5SiO_{24}$- zircon (squares) as a function of total weight percent zircon in the body.

The present invention relates to a refractory ceramic material which includes an NZP-type phosphate phase and at least 10 weight percent of a second phase having a substantially higher heat capacity per unit volume than the phosphate phase. By "NZP-type" is meant a solid phase in which the arrangement of atoms is generally similar to that of the type compound $NaZr_2P_3O_{12}$, but in which some or all of the sodium, zirconium, or phosphorus is replaced by other substituent atoms. Also, additional atoms may be substituted into the crystal lattice sites that are vacant in $NaZr_2P_3O_{12}$, but which are fully occupied in the $Na_4Zr_2Si_3O_{12}$ compound, which is also an NZP-type phase. In the present invention the NZP-type phosphate phase is represented by the general formula $R_{1+(x/2)}Zr_4P_{6-x}Si_xO_{24}$ where R is selected from the group consisting of Ba, Ca, and Sr and $0 \leq x \leq 2$.

The phosphate phase has a high melting point greater than 1650° C. a negative CTE of less than or equal to $-20 \times 10^{-7}$/° C. along at least one of its crystallographic axes, and a volumetric heat capacity of about 2.3 J/cm$^3$K to 3.0 J/cm$^3$K. Two especially preferred compositions for the phosphate phase are $CaZr_4P_6O_{24}$ and $Sr_{1.5}Zr_4P_5SiO_{24}$.

The second phase has a substantially higher volumetric heat capacity than the phosphate phase, preferably at least about 3.3 J/cm$^3$K and a positive coefficient of thermal expansion. Accordingly, the inventive ceramic has a high volumetric heat capacity of at least about 3.15 J/cm$^3$K.

Two especially preferred compositions for the second phase are zircon ($ZrSiO_4$) and zirconia ($ZrO_2$). In the inventive ceramic the second phase is about 10 to 90% based on weight, more preferably about 20 to 80% based on weight and still more preferably about 50 to 80% based on weight.

The inventive ceramic exhibits high permeability by virtue of high, interconnected porosity and large median pore size, making it suitable in filtration applications. Total porosity reported as volume percent and pore size reported as median pore diameter in micrometers are measured by mercury porosimetry.

The inventive ceramic has a permeability of at least about $0.25 \times 10^{-12}$ m$^2$, preferably at least about $0.8 \times 10^{-12}$ m$^2$, and more preferably at least about $1.2 \times 10^{-12}$ m$^2$. The total porosity is at least about 35% and preferably at least about 42%. The median pore diameter is at least about 6 micrometers, preferably at least about 9 micrometers, and more preferably at least about 13 micrometers.

The mean crystal or grain size of the second phase is preferably at least about 10 micrometers, and more preferably at least about 25 micrometers, as measured by applying standard stereographic principles to analysis of polished sections of the ceramic by microscopy.

Other advantages of the inventive structures include good strength, and high thermal shock resistance, making them suitable for use in harsh environments. The structures exhibit a four-point modulus of rupture as measured on a solid rod of circular cross section of at least about 300 psi, preferably at least about 700 psi, and more preferably at least about 1000 psi. The structures exhibit a four-point modulus of rupture as measured on a cellular bar cut from the honeycomb body of at least about 150 psi, preferably at least about 200 psi. It is preferred that the melting point be greater than 1700° C. and the mean coefficient of thermal expansion from 22° to 1000° C. be between $-15 \times 10^{-7}$/° C. and $+15 \times 10^{-7}$/° C., resulting in excellent thermal shock resistance.

The inventive structures are especially suited as diesel particulate filters, especially in applications where regeneration of the filter by burning of the carbon soon can result in locally high temperatures within the filter, thus necessitating excellent thermal shock resistance and a high melting point of the filter. Specifically, the inventive structures are especially suited as multicellular honeycomb structures having a high filter volumetric heat capacity, a low pressure drop between the entrance and exit faces of the filter, a low CTE, and a high filtration efficiency.

The honeycomb structure has an inlet and outlet end or face, and a multiplicity of cells extending from the inlet end to the outlet end, the cells having porous walls. These cells are end plugged, such as described in U.S. Pat. No. 4,329, 162 which is herein incorporated by reference. Preferably, the inventive filters have cellular densities from about 100 cells/in$^2$ (15.5 cells/cm$^2$) to about 400 cells/in$^2$ (62 cells/cm$^2$).

The invention also relates to a method for fabricating the two-phase phosphate based ceramic by forming a mixture of coarse particulate raw materials, solvent, binders, lubricants, and/or plasticizers, shaping the mixture into a green body, optionally drying, and then firing to form the product structure.

The raw materials may include partially or fully pre-reacted powders of the phases that are to be present in the final structure. Alternatively, the raw materials may include precursor material that react with one another during firing to form the phases that are to be present in the final structure. It is a critical aspect of the inventive method that the starting materials be of sufficiently coarse particle size to produce a fired ceramic body in which the percent porosity, median pore size, and pore interconnectivity result in a high permeability ceramic as described herein above.

For the NZP-phase, some advantageous raw materials are compounds of zirconium and/or phosphorous, as described in pending application having Ser. No. 09/671,722, entitled "Refractory NZP-type Structures and Method of Making and Using Same" by Gregory A. Merkel, co-assigned to the present assignee, and herein incorporated by reference in its entirety. When phosphorus compounds are used, it is preferred that the median particle size be at least about 15 micrometers, preferably at least about 35 micrometers, and more preferably at least about 50 micrometers. Some preferred compounds are $Zr_2P_2O_9$, $ZrP_2O_7$, $Zr(HPO_4)_{2-y}\cdot x H_2O$, and combinations of these, where $0 \leq y \leq 1$ and $0 \leq x \leq 2$. Also preferred are zirconium phosphate powders composed of one or more crystalline or amorphous phases whose composition can be expressed as $Zr_2P_{2+2y}O_{9+5y}$ where $0 \leq y \leq 1$.

Other advantageous raw materials are sulfates and/or carbonates of calcium, strontium, and/or barium. With these combinations it is preferred that the median particle size of the total charge of the selected compounds be at least about 5 micrometers, more preferably at least about 15 micrometers, even more preferably at least 35 micrometers.

Still other advantageous raw materials are $CaZrO_3$, $SrZrO_3$, $BaZrO_3$, and combinations of these. Here also, with these particular raw materials it is preferred that the median particle size of the total charge of the selected compounds be at least about 15 micrometers, more preferably at least about 35 micrometers, even more preferably at least 50 micrometers, and may be in excess of 100 micrometers.

In another embodiment, it is advantageous to have as one of the raw materials, zirconium oxide powder having a median particle diameter of at least about 10 micrometers, and more preferably at least 25 micrometers. Still preferred is to remove the coarse fraction of particles such as by sieving or air classification so that 100% of the particles are <150 micrometers, and most preferred about 100%<100 micrometers.

It is preferred that the second, high volumetric heat capacity phase be zircon. As such the second phase may be formed by adding a zircon powder or may be formed during firing by reaction of a silica source with a zirconia source. When zircon powder is used as a starting material, it is preferred that the median particle size of the zircon powder be at least about 15 micrometers, more preferably at least about 35 micrometers, and even more preferably at least 50 micrometers. If the zircon is to be formed by reaction of a silica source and a zirconia source, at least a part of the silica source and a part of the zirconia source must consist of powders having a median particle size of at least 15 micrometers, more preferably at least 35 micrometers, and even more preferably at least 50 micrometers. The silica source may be an oxide or organic compound capable of converting to $SiO_2$, during heating, such as a silicone oil or silicone resin, a silicon alkoxide, amorphous silica such as a colloidal silica or fused silica, or a crystalline silica such as a zeolite or quartz. Alternatively, the silica source may be a compound of silica with one or more other elements that are to be present in the final body. For example, $CaSiO_3$, wollastonite, could be used as a silica source in bodies in which the NZP phase is a calcium-containing NZP.

Optionally an additional metal oxide source may be added to the raw material mixture to serve as a sintering aid to strengthen the fired body.

The raw materials are mixed with a liquid, binder, lubricant, and/or plasticizer and shaped into a green body by any method such as injection molding, slip casting, centrifugal casting, pressure casting, tape casting, dry pressing, calendering, roll compaction, extrusion, etc.

It is preferred that the green body is shaped by extrusion. The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal. The resulting shaped green structure can then be dried.

It is then heated to a maximum temperature of about 1200° C. to 1750° C. over a period of about 2 to 200 hours, preferably 10 to 100 hours, and held at the maximum temperature for 0.1 to 100 hours, preferably 1 to 30 hours. The firing may be conducted in an electrically heated furnace or gas kiln, or the green structure may be heated by microwave radiation. The partial pressure of oxygen in the firing atmosphere is preferably at least 0.01 atmospheres, and more preferably at least 0.10 atmospheres, especially when the hold temperature is greater than about 1450° C. Higher hold temperatures and longer hold times are advantageous for increasing the strength and median pore size of the structure, and can also reduce the coefficient of thermal expansion.

It is preferred that the structure be plugged as described previously. This can be done by standard methods utilized in making alternately plugged honeycombs. For example, the ends of the alternate channels of the green structure can be plugged with a paste having the same or similar composition to that of the green body, using appropriate amounts of a liquid phase to impart a workable viscosity, optionally with the addition of binders and plasticizers. In this case, the plugged green ware is dried and fired as described above. Alternatively, the green structure without plugs is fired as above. After cooling, alternate channels may be plugged with a paste of similar composition to that of the green body which undergoes minimal shrinkage during firing, and refired to a temperature of 1200° C. to 1750° C. to consolidate the plugs, or the alternate channels may be plugged with a cement material which hardens or cures to a refractory material after drying or heating to a low temperature such as less than 600° C.

It is preferred to have diesel particulate filters comprising the inventive structure with a cell density of 150 to 250 cells per square inch and a cell wall thickness of 0.015 to 0.025 inches.

To more fully illustrate the invention, the following non-limiting examples are presented. All parts, portions, and percentages are on a weight basis unless otherwise stated.

EXAMPLES

Mixtures were made with precursor powders of barium carbonate, calcium carbonate, or strontium carbonate, zirconia, $ZrP_2O_7$, zircon, and either silicon resin dissolved in dibasic ester or quartz. Those mixtures which contained barium or calcium also had 0.5% $Mg(OH)_2$ added as a sintering aid. Methyl cellulose was added as a binder and sodium stearate was added as a lubricant.

All dry raw materials, including binders and lubricant, were weighed into a container and dry mixed without milling media to provide some homogenization on a macroscopic scale. The mixtures were then transferred into a stainless steel muller to which distilled water was gradually added in a quantity sufficient to impart plasticity to the mixture. In examples in which silicone resin was employed as a source of silica, the resin/DBE solution was added prior to the addition of the water. The mixture was then extruded into honeycomb cellular bodies having about 200 cells per square inch (31 cells/cm$^2$), and having a wall thickness of about 0.010 to 0.023 inches (0.025 to 0.058 cm).

The extruded materials were then dried in an oven at 95° C. and cut to desired lengths. Samples were fired in an electrically heated furnace at rates ranging from 25° C./hr to 100° C./hr over various temperature intervals to a maximum temperature of 1550° C. and held there for 6 hours (calcium-containing mixtures) or 1550° C. and held there for 20 hours (barium- and strontium-containing mixtures). The cellular bodies were plugged as described previously.

Percent porosity, pore volume (intrusion volume), pore size distribution, and median pore diameter were determined by mercury porosimetry.

Permeability was measured on pieces of cell wall using a Perm Automated Porometer® Version 6.0 (Porous Materials, Inc., Ithaca, N.Y.). The value of the permeability is obtained as follows. A piece of fired cell wall is mounted with epoxy onto a disc-shaped sample holder which has a circular opening. The epoxy is applied around the perimeter of the opening such that the sample covers the opening and such that no air can pass through the opening without passing through the sample, and such that the area of the sample through which the air passes is very nearly the same as the area of the circular opening of the sample holder. The sample is then placed in the chamber of the automated porometer and a differential air pressure is applied across the sample. The volumetric air flow on the outlet end of the sample is measured as a function of the pressure applied to the inlet face of the sample. The specific permeability, k, is then computed from the following relation:

$$k = \frac{\eta Q L}{AP}$$

where $\eta$ is the viscosity of air at room temperature in units of megapascal seconds, L is the thickness of the sample in units of meters, Q is the uniaxial volume flow rate of air through the sample in cubic meters per second, A is the area through which air is allowed to pass through the sample, approximately equal to the area of the opening of the sample holder, in units of square meters, and P is the differential pressure across the thickness of the sample in units of megapascals. The specific permeability, also referred to as permeability, is thus expressed in units of square meters, m$^2$.

The mean coefficients of thermal expansion (CTE) from 22° to 1000° C. were measured using a dilatometer and is expressed in units of ° C.$^{-1}$.

The volumetric heat capacity of the solid component of the ceramic, $C_{p(solid)}$ was determined according to the relation $C_{p(solid)} = (D_{solid})(C_{p(ceramic)})$, where $D_{solid}$ is the bulk density of the solid in units of grams per cubic centimeter (g/cm$^3$) and $C_{p(ceramic)}$ is the specific heat capacity of the ceramic in units of Joules per gram per degree Kelvin (J/g K). The density of the solid, also known as the skeletal density, is equal to the density of the ceramic excluding the porosity. Thus, the volumetric heat capacity of the filter is in units of J/cm$^3$K.

The phase assemblage of the final structure was identified by powder x-ray diffractometry.

FIG. 1 illustrates the mean CTE (22° to 1000° C.) of ceramics prepared according to the present invention and comprising CaZr$_4$P$_6$O$_{24}$-zircon and Sr$_{1.5}$Zr$_4$P$_5$SiO$_{24}$-zircon as a function of total weight percent zircon in the body. Additions of 20–80 weight percent zircon are preferred to obtain a final structure with a CTE of between −10 to +10×10$^{-7}$/° C.

An advantage of the inventive filters is their high volumetric heat capacity which results in a lower maximum temperature achieved during regeneration, both controlled and uncontrolled, within the filter, such that the filter is less susceptible to damage and can withstand repeated regeneration cycles.

Tables 1 and 2 provide additional information on some of the examples of the present invention ("inv"), together with some comparative examples ("comp"). The NZP phase in Examples 1–6 in Table 1 and Examples 7–9 in Table 2 had a composition of Sr$_{1.5}$Zr$_4$P$_5$SiO$_{24}$. Examples 10 and 11 in Table 2 provide comparative examples of NZP type ceramics which do not contain substantial amounts of a second phase having a high volumetric heat capacity. The NZP of Example 10 had the composition Ba$_{1.25}$Zr$_4$P$_{5.5}$Si$_{0.5}$O$_{24}$ and the NZP of Example 11 had the composition Sr$_{1.325}$Zr$_4$P$_{5.35}$Si$_{0.65}$O$_{24}$.

Median particle sizes of the zircon powders are listed in the tables. Median particle sizes of the other raw materials, in micrometers ($\mu$m), are as follows: BaCO$_3$ (40 $\mu$m), SrCO$_3$ (20 $\mu$m), ZrO$_2$ A (26 $\mu$m), ZrO$_2$ B (60 $\mu$m), ZrP$_2$O$_7$ (21 $\mu$m), quartz (3 $\mu$m), Mg(OH)$_2$ (0.2 $\mu$m), and graphite (33 $\mu$m). The silicone resin was dissolved in dibasic ester in a 2 to 1 weight ratio.

TABLE 1

| Example Number | 1 | 2 | 3 | 4 | 5 | 6 |
|---|---|---|---|---|---|---|
| Example Type | Comp | Inv | Inv | Inv | Inv | Inv |
| Weight Percentages of Raw Materials | | | | | | |
| Zircon (ZrSiO$_4$) | 45.97 | 45.97 | 45.97 | 45.97 | 45.97 | 45.97 |
| Barium carbonate (BaCO$_3$) | 0 | 0 | 0 | 0 | 0 | 0 |
| Strontium carbonate (SrCO$_3$) | 9.58 | 9.58 | 9.58 | 9.58 | 9.58 | 9.58 |
| Zirconium oxide A (ZrO$_2$) | 7.99 | 7.99 | 7.99 | 7.99 | 7.99 | 7.99 |
| Zirconium oxide B (ZrO$_2$) | 0 | 0 | 0 | 0 | 0 | 0 |
| Zirconium phosphate (ZrP$_2$O$_7$) | 28.66 | 28.66 | 28.66 | 28.66 | 28.66 | 28.66 |
| Silicone resin + dibasic ester | 7.79 | 7.79 | 7.79 | 7.79 | 7.79 | 7.79 |
| Quartz (SiO$_2$) | 0 | 0 | 0 | 0 | 0 | 0 |
| Magnesium hydroxide (Mg(OH)$_2$) | 0 | 0 | 0 | 0 | 0 | 0 |

TABLE 1-continued

| Example Number | 1 | 2 | 3 | 4 | 5 | 6 |
|---|---|---|---|---|---|---|
| Example Type | Comp | Inv | Inv | Inv | Inv | Inv |
| Particle Size Distribution | | | | | | |
| Median Particle Size of Zircon (micrometers) | 11 | 15 | 32 | 41 | 65 | 138 |
| Pore Forming Agent (weight %) | | | | | | |
| Graphite | 0 | 0 | 0 | 0 | 0 | 0 |
| Binder, Lubricant, and Solvents (weight %) | | | | | | |
| Methylcellulose | 6.0 | 6.0 | 6.0 | 6.0 | 6.0 | 6.0 |
| Sodium stearate | 0.8 | 0.8 | 0.8 | 0.8 | 0.8 | 0.8 |
| Firing Conditions | | | | | | |
| Maximum Temperature (° C.) | 1550 | 1550 | 1550 | 1550 | 1550 | 1550 |
| Hold Time (hours) | 20 | 20 | 20 | 20 | 20 | 20 |
| Properties of Fired Ware | | | | | | |
| Weight percent zircon in final body | 50 | 50 | 50 | 50 | 50 | 50 |
| Modulus of Rupture (cellular bar) (psi) | — | — | — | — | 170 | — |
| Open Porosity (%) | 32 | 38 | 41 | 39 | 40 | 46 |
| Median Pore Diameter (micrometers) | 6 | 7.3 | 7 | 10 | 13 | 15 |
| Permeability ($10^{-12}$ m$^2$) | 0.17 | 0.36 | 0.35 | 0.73 | 1.28 | 2.6 |
| Mean CTE from 22 to 1000° C. ($10^{-7}$/° C.) | 7.8 | 5.1 | 6.0 | 7.8 | 3.4 | -1.3 |
| Volumetric Heat Capacity (solid) (J/cm$^3$K) | — | — | — | — | 3.38 | — |

TABLE 2

| Example Number | 7 | 8 | 9 | 10 | 11 |
|---|---|---|---|---|---|
| Example Type | Inv | Inv | Inv | Comp | Comp |
| Weight Percentages of Raw Materials | | | | | |
| Zircon (ZrSiO$_4$) | 31.86 | 60.62 | 45.97 | 0 | 0 |
| Barium carbonate (BaCO$_3$) | 0 | 0 | 0 | 20.03 | 0 |
| Strontium carbonate (SrCO$_3$) | 12.32 | 7.29 | 9.58 | 0 | 16.58 |
| Zirconium oxide A (ZrO$_2$) | 10.28 | 6.09 | 7.99 | 0 | 13.84 |
| Zirconium oxide B (ZrO$_2$) | 0 | 0 | 0 | 12.51 | 0 |
| Zirconium phosphate (ZrP$_2$O$_7$) | 36.89 | 19.15 | 28.66 | 59.21 | 60.12 |
| Silicone resin + dibasic ester | 7.96 | 6.85 | 7.79 | 8.26 | 8.25 |
| Quartz (SiO$_2$) | 0.69 | 0 | 0 | 0 | 0.56 |
| Magnesium hydroxide (Mg(OH)$_2$) | 0 | 0 | 0 | 0.50 | 0.65 |
| Particle Size Distribution | | | | | |
| Median Particle Size of Zircon (micrometers) | 65 | 65 | 65 | — | — |
| Pore Forming Agent (weight %) | | | | | |
| Graphite | 0 | 0 | 20 | 0 | 0 |
| Binder, Lubricant, and Solvents (weight %) | | | | | |
| Methylcellulose | 6.0 | 6.0 | 6.0 | 6.0 | 6.0 |
| Sodium stearate | 0.8 | 0.8 | 0.8 | 0.8 | 0.8 |
| Firing Conditions | | | | | |
| Maximum Temperature (° C.) | 1550 | 1550 | 1550 | 1550 | 1550 |
| Hold Time (hours) | 20 | 20 | 20 | 20 | 20 |
| Properties of Fired Ware | | | | | |
| Weight percent zircon in final body | 35 | 65 | 50 | 0 | 0 |
| Modulus of Rupture (cellular bar) (psi) | — | 218 | — | — | — |
| Open Porosity (%) | 48 | 44 | 51 | 53 | 49 |
| Median Pore Diameter (micrometers) | 10 | 16 | 19.5 | 12 | 13 |
| Permeability ($10^{-12}$ m$^2$) | 0.89 | 1.08 | 2.99 | 1.4 | 1.2 |
| Mean CTE from 22 to 1000° C. ($10^{-7}$/° C.) | -5.0 | 14.8 | 7.5 | 5 | 5 |
| Volumetric Heat Capacity (solid) (J/cm$^3$K) | — | — | — | 2.89 | 2.86 |

It is claimed:

1. A ceramic comprising a first phase having a general formula $R_{1+(x/2)}Zr_4P_{6-x}Si_xO_{24}$ where R is selected from the group consisting of Ba, Ca, and Sr and $0 \leq x \leq 2$, wherein the first phase has a volumetric heat capacity ($C_{p1}$), and at least 10 weight percent of a second phase having a volumetric heat capacity ($C_{p2}$), wherein $C_{p2} > C_{p1}$, wherein the ceramic has a coefficient of thermal expansion from 22° to 1000° C. of $-15 \times 10^{-7}$/° C. to $+15 \times 10^{-7}$/° C., a permeability of at least $0.25 \times 10^{-12}$ m$^2$, a total porosity of at least 35% by volume, a median pore diameter of at least 6 micrometers, and a volumetric heat capacity $C_{p(solid)}$ of at least 3.15 J/cm³ K.

2. The ceramic of claim 1 wherein the first phase is $CaZr_4P_6O_{24}$.

3. The ceramic of claim 1 wherein the first phase is $Sr_{1.5}Zr_4P_5SiO_{24}$.

4. The ceramic of claim 1 wherein $C_{p2}$ is 3.3 J/cm³ K.

5. The ceramic of claim 4 wherein the second phase is about 10 to 90% by weight of the ceramic.

6. The ceramic of claim 5 wherein the second phase is about 20 to 80% by weight of the ceramic.

7. The ceramic of claim 6 wherein the second phase is about 50 to 80% by weight of the ceramic.

8. The ceramic of claim 4 wherein the second phase is selected from the group consisting of zircon ($ZrSiO_4$) and zirconia ($ZrO_2$).

9. The ceramic of claim 8 wherein the second phase is zircon.

10. The ceramic of claim 1 wherein the permeability is at least about $0.8 \times 10^{-12}$ m².

11. The ceramic of claim 9 wherein the permeability is at least about $1.2 \times 10^{-12}$ m².

12. The ceramic of claim 1 wherein the total porosity is at least about 42%.

13. The ceramic of claim 1 wherein the median pore diameter is at least about 9 micrometers.

14. The ceramic of claim 13 wherein the median pore diameter is at least about 13 micrometers.

15. The ceramic of claim 1 wherein the second phase has a grain size of at least about 10 micrometers.

16. The ceramic of claim 15 wherein the second phase has a grain size of at least about 25 micrometers.

17. The ceramic of claim 1 wherein the first phase is $CaZr_4P_6O_{24}$ and the second phase is zircon.

18. The ceramic of claim 1 wherein the first phase is $Sr_{1.5}Zr_4P_5SiO_{24}$ and the second phase is zircon.

19. The ceramic of claim 1 wherein the ceramic is used for filtering particulates from diesel engine exhaust.

20. A diesel particulate filter comprising a ceramic comprising a first phase having a general formula $R_{1+(x/2)}Zr_4P_{6-x}Si_xO_{24}$ where R is selected from the group consisting of Ba, Ca, and Sr and $0 \leq x \leq 2$, wherein the first phase has a volumetric heat capacity ($C_{p1}$), and at least 10 weight percent of a second phase having a volumetric heat capacity ($C_{p2}$), wherein $C_{p2} > C_{p1}$, wherein the ceramic has a coefficient of thermal expansion from 22° to 1000° C. of $-15 \times 10^{-7}/°$ C. to $+15 \times 10^{-7}/°$ C., a permeability of at least $0.25 \times 10^{-12}$ m², a total porosity of at least 35% by volume, a median pore diameter of at least 6 micrometers, and a volumetric heat capacity $C_{p(solid)}$ of at least 3.15 J/cm³ K.

21. The diesel particulate filter of claim 20 wherein the filter has the shape of a honeycomb, the honeycomb having an inlet end and an outlet end, and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

22. The ceramic of claim 20 wherein the first phase is $CaZr_4P_6O_{24}$.

23. The ceramic of claim 20 wherein the first phase is $Sr_{1.5}Zr_4P_5SiO_{24}$.

24. The ceramic of claim 20 wherein $C_{p2}$ is at least 3.3 J/cm³ K.

25. The ceramic of claim 24 wherein the second phase is selected from the group consisting of zircon ($ZrSiO_4$) and zirconia ($ZrO_2$).

26. The ceramic of claim 25 wherein the second phase is zircon.

27. The ceramic of claim 20 wherein the permeability is at least about $0.8 \times 10^{-12}$ m².

28. The ceramic of claim 27 wherein the permeability is at least about $1.2 \times 10^{-12}$ m².

29. The ceramic of claim 20 wherein the total porosity is at least about 42%.

30. The ceramic of claim 20 wherein the median pore diameter is at least about 9 micrometers.

31. The ceramic of claim 30 wherein the median pore diameter is at least about 13 micrometers.

32. The ceramic of claim 20 wherein the second phase has a grain size of at least about 10 micrometers.

33. The ceramic of claim 32 wherein the second phase has a grain size of at least about 25 micrometers.

34. The ceramic of claim 20 wherein the first phase is $CaZr_4P_6O_{24}$ and the second phase is zircon.

35. The ceramic of claim 20 wherein the first phase is $Sr_{1.5}Zr_4P_5SiO_{24}$ and the second phase is zircon.

36. A method of making a ceramic, the method comprising:

a) forming a mixture comprising raw material powders capable of reacting to form a ceramic comprising a first phase having a general formula $R_{1+(x/2)}Zr_4P_{6-x}Si_xO_{24}$ where R is selected from the group consisting of Ba, Ca, and Sr and $0 \leq x \leq 2$, and a second phase selected from the group consisting of zircon and zirconia, wherein the second phase is about 10 to 90% based on weight of the final ceramic;

b) shaping the mixture into a green body;

c) firing the green body to produce a ceramic comprising a first phase having a general formula $R_{1+(x/2)}Zr_4P_{6-x}Si_xO_{24}$ where R is selected from the group consisting of Ba, Ca, and Sr and $0 \leq x \leq 2$, wherein the first phase has a volumetric heat capacity ($C_{p1}$), and at least 10 weight percent of a second phase selected from the group consisting of zircon and zirconia, wherein the second phase has a volumetric heat capacity ($C_{p2}$), wherein $C_{p2} > C_{p1}$, wherein the ceramic has a coefficient of thermal expansion from 22° to 1000° C. of $-15 \times 10^{-7}/°$ C. to $+15 \times 10^{-7}/°$ C., a permeability of at least $0.25 \times 10^{-12}$ m², a total porosity of at least 35% by volume, a median pore diameter of at least 6 micrometers, and a volumetric heat capacity $C_{p(solid)}$ of at least 3.15 J/cm³ K.

37. The method of claim 36 wherein the raw materials for the first phase comprise compounds of zirconium and phosphorous.

38. The method of claim 37 wherein phosphorus compounds are included in the mixture and have a median particle diameter of at least about 15 micrometers.

39. The method of claim 38 wherein the phosphorus compounds have a median particle diameter of at least about 35 micrometers.

40. The method of claim 39 wherein the phosphorus compounds have a median particle diameter of at least about 50 micrometers.

41. The method of claim 40 wherein the compounds are selected from the group consisting of $Zr_2P_2O_9$, $ZrP_2O_7$, $Zr_2P_{2+2y}O_{9+5y}$, $Zr(HPO_4)_{2-y} \cdot xH_2O$ and combinations thereof, wherein $0 \leq y \leq 1$ and $0 \leq x \leq 2$.

42. The method of claim 36 wherein the raw materials for the first phase comprise compounds selected from the group consisting of calcium carbonate, calcium sulfate, strontium carbonate, strontium sulfate, barium carbonate, barium sulfate, and combinations thereof.

43. The method of claim 42 wherein the median particle diameter of the total of the selected compounds is at least about 5 micrometers.

44. The method of claim 43 wherein the median particle diameter of the total of the selected compounds is at least about 15 micrometers.

45. The method of claim 44 wherein the median particle diameter of the total of the selected compounds is at least about 35 micrometers.

46. The method of claim 36 wherein the raw materials for the first phase comprise compounds selected from the group consisting of $CaZrO_3$, $SrZrO_3$, $BaZrO_3$, and combinations thereof.

47. The method of claim 46 wherein the median particle diameter of the total of the selected compounds is at least about 15 micrometers.

48. The method of claim 47 wherein the median particle diameter of the total of the selected compounds is at least about 35 micrometers.

49. The method of claim 48 wherein the median particle diameter of the total of the selected compounds is at least about 50 micrometers.

50. The method of claim 49 wherein the median particle diameter of the total of the selected compounds is at least about 100 micrometers.

51. The method of claim 36 wherein at least one of the raw materials for the first phase is zirconium oxide powder having a median particle diameter of at least about 10 micrometers.

52. The method of claim 36 wherein the raw materials for the second phase include zircon powder.

53. The method of claim 52 wherein the median particle size of the zircon powder is at least about 15 micrometers.

54. The method of claim 53 wherein the median particle size of the zircon powder is at least about 35 micrometers.

55. The method of claim 53 wherein the median particle size of the zircon powder is at least about 50 micrometers.

56. The method of claim 36 wherein the second phase is zircon.

57. The method of claim 56 wherein the second phase is formed by reaction of a silica source and a zirconia source.

58. The method of claim 57 wherein the silica source is of a particulate form having a median particle size of at least 15 micrometers.

59. The method of claim 58 wherein the silica source is of a particulate form having a median particle size of at least 35 micrometers.

60. The method of claim 59 wherein the zirconia source is of a particulate form having a median particle size of at least 15 micrometers.

61. The method of claim 60 wherein the zirconia is of a particulate form having a median particle size of at least 35 micrometers.

62. The method of claim 61 wherein the median particle size of the zircon powder is at least about 50 micrometers.

63. The method of claim 36 wherein the firing temperature is about 1200° C. to 1750° C.

64. The method of claim 36 wherein the mixture is shaped by extrusion.

65. The method of claim 64 wherein the mixture is extruded into a honeycomb structure having an inlet and outlet end and a multiplicity of cells extending from inlet end to outlet end, the cells having porous walls.

* * * * *